US 6,614,609 B1

(12) United States Patent
Reed et al.

(10) Patent No.: US 6,614,609 B1
(45) Date of Patent: Sep. 2, 2003

(54) GRAY CODE DETECTION FOR A DISK DRIVE SYSTEM

(75) Inventors: David E. Reed, Westminster, CO (US); Sian She, Broomfield, CO (US)

(73) Assignee: Cirrus Logic, Inc., Austin, TX (US)

(*) Notice: Subject to any disclaimer, the term of this patent is extended or adjusted under 35 U.S.C. 154(b) by 0 days.

(21) Appl. No.: 09/520,535

(22) Filed: Mar. 8, 2000

(51) Int. Cl.[7] .................................................. G11B 5/09
(52) U.S. Cl. ..................................... 360/51; 360/77.02
(58) Field of Search ............................... 360/51, 77.08, 360/77.02

(56) References Cited

U.S. PATENT DOCUMENTS

| 5,726,818 A | 3/1998 | Reed et al. |
| 5,737,142 A | 4/1998 | Zook |
| 5,786,950 A | 7/1998 | Zook et al. |
| 5,926,490 A | 7/1999 | Reed et al. |
| 6,137,646 A | * 10/2000 | Okamura et al. .............. 360/51 |
| 6,233,715 B1 | * 5/2001 | Kuki et al. .................... 341/68 |

OTHER PUBLICATIONS

Siegel, Paul H., "Modulation and Coding for Information Storage," IEEE Communications Magazine, IEEE, p. 68–86, (Dec. 2, 1991).

* cited by examiner

Primary Examiner—David Hudspeth
Assistant Examiner—Varsha A. Kapadia
(74) Attorney, Agent, or Firm—Duft Setter Ollila & Bornsen LLC

(57) ABSTRACT

A disk drive system is disclosed that includes a disk device coupled to control circuitry. The control circuitry includes a read channel with a detector that detects a bit sequence associated with Gray codes and delays indications of the bit sequence detection to handle phase shifts. The detector generates a Gray code detection signal in response to the delayed indications. The control circuitry processes the Gray code in response to the Gray code detection signal.

38 Claims, 6 Drawing Sheets

GRAY CODE DETECTION FOR A DISK DRIVE SYSTEM

BACKGROUND OF THE INVENTION

1. Field of the Invention

The invention is related to the field of disk drive systems, and in particular to disk drive systems and circuitry that detect Gray codes in servo fields in the presence of phase shift.

2. Statement of the Problem

A disk drive system stores user data in tracks on its disks. The user data in the tracks is interspersed with servo data. The servo data includes Gray codes that identify the various tracks by cylinder number. The Gray codes may also identify head numbers and auxiliary data. The disk drive system uses the cylinder number to locate a target track before it can transfer selected user data. Because Gray codes are used to locate the user data tracks, Gray code detection is critical to proper system operation.

Gray Codes are encoded at regular intervals in the tracks and include a bit sequence that is used to detect the Gray codes. To detect a Gray code, a head is positioned over one of the tracks and senses the data encoded on the disk to generate a read signal. The disk drive system converts the read signal into a sequence of samples. The samples are passed through a matched filter to detect the Gray code detection bit sequence.

The matched filter typically operates well when the Gray codes are aligned from one track to the next. Unfortunately, the matched filter may fail during a transition between tracks if the Gray codes in the respective tracks are not aligned. The mis-alignment causes a phase shift that the matched filter cannot effectively handle. The failure to detect Gray codes interrupts system operation and inhibits the transfer of user data.

SUMMARY OF THE SOLUTION

The invention solves the above problem by using circuitry that detects Gray codes in the presence of phase shift. The Gray code detection circuitry accurately detects mis-aligned Gray codes when the system transitions from one track to another. System operation is improved because Gray code detection failure is reduced resulting in fewer interruptions during user data transfer.

The invention includes disk drive systems, circuitry, and methods of operation. The disk drive system includes a disk device coupled to control circuitry. The control circuitry includes a read channel with a detector that detects a bit sequence associated with Gray codes and delays indications of the bit sequence detection to handle phase shifts. The detector generates a Gray code detection signal in response to the delayed indications. The control circuitry processes the Gray code in response to the Gray code detection signal.

A particular reference number represents the same element on all figures.

DETAILED DESCRIPTION

Figure 1:
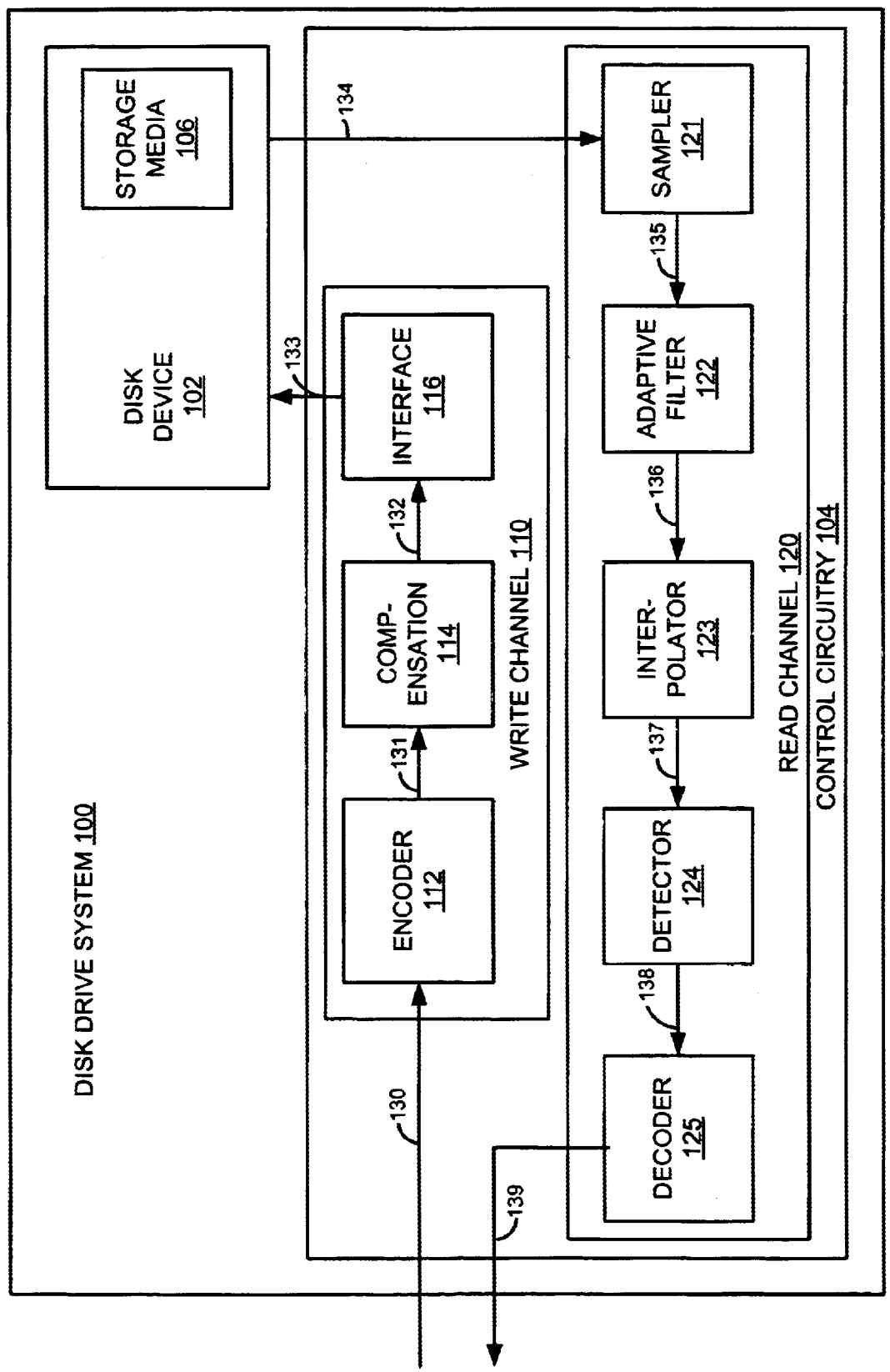
FIG. 1 is a block diagram that illustrates a disk drive system in the prior art.
Figure 2:
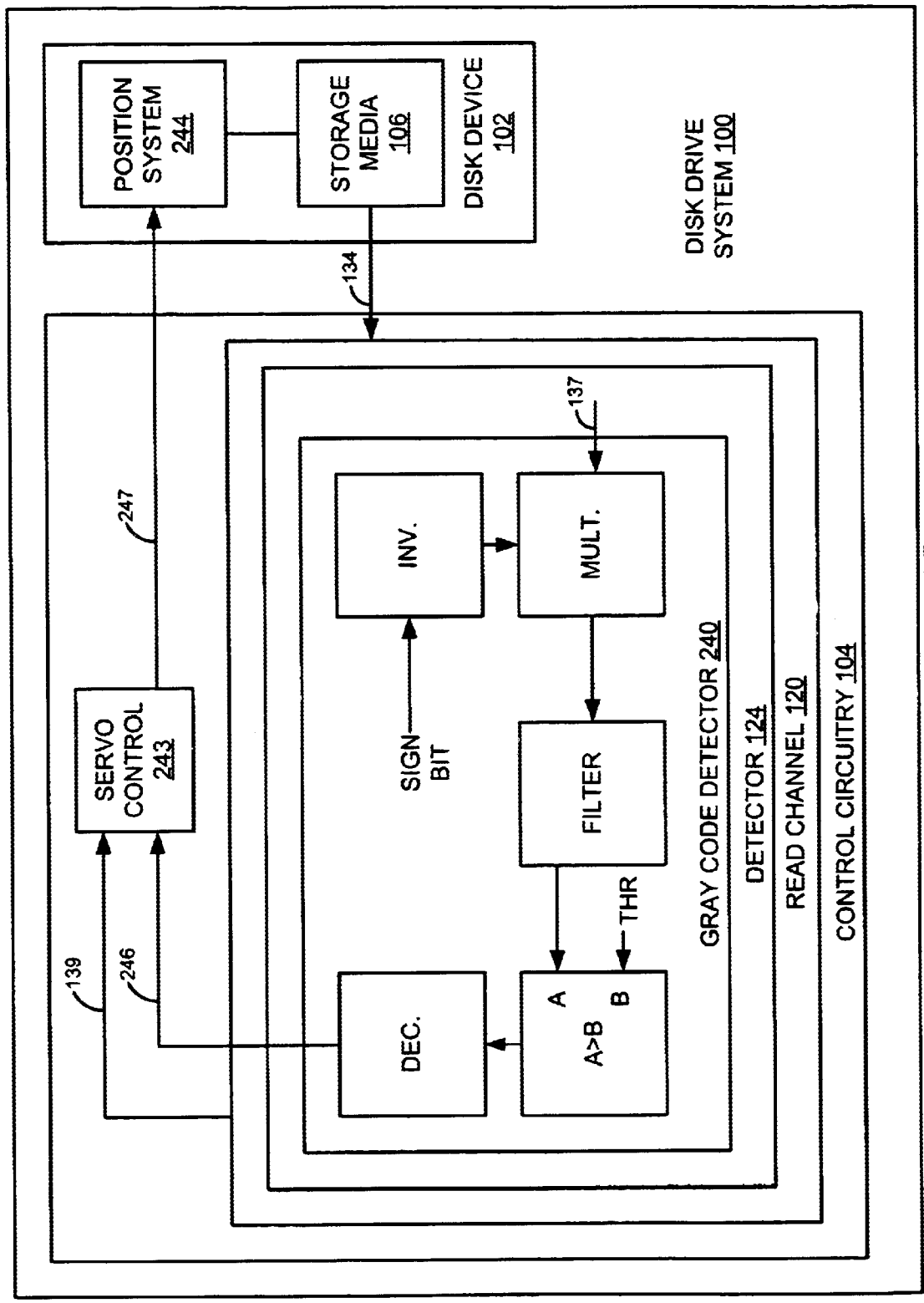
FIG. 2 is a block diagram that illustrates a servo system in the prior art.
Figure 3:
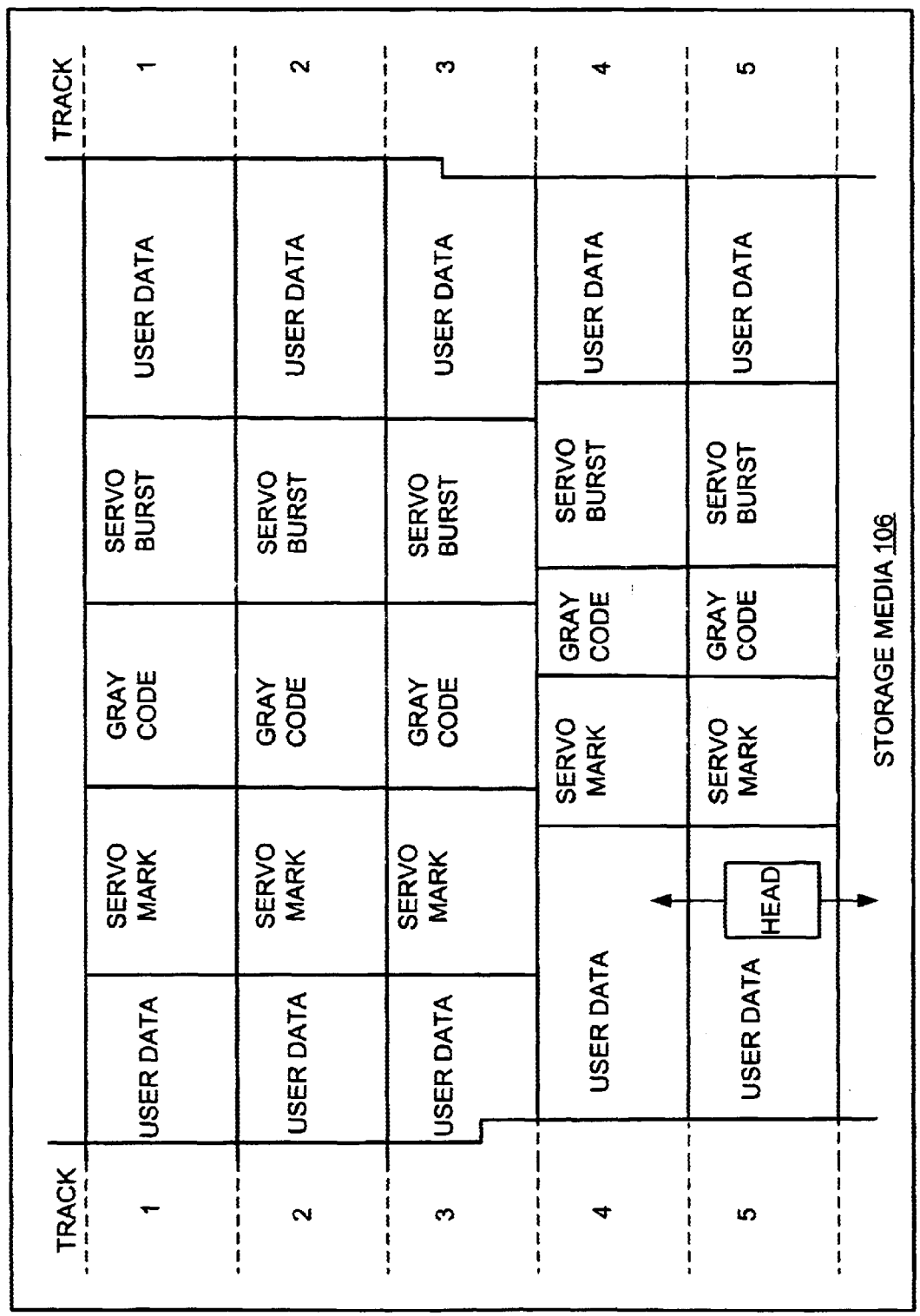
FIG. 3 is a block diagram that illustrates Gray codes in the prior art.

Prior Art Disk Drive System—FIGS. 1–3

FIG. 1 shows an example of the user data path for a disk drive system 100 in the prior art. Disk drive system 100 includes a disk device 102 and associated control circuitry 104. Disk device 102 includes storage media 106. Some examples of storage media 106 include magnetic disks and optical disks. Control circuitry 104 includes write channel 110 and read channel 120. Write channel 110 includes encoder 112, compensation 114, and write interface 116 connected in series. Read channel 120 includes sampler 121, adaptive filter 122, interpolator 123, detector 124, and decoder 125 connected in series. Interface 116 and sampler 121 are coupled to disk device 102.

Write channel 110 receives data signal 130 and transfers a corresponding write signal 133 to disk device 102. Disk device 102 stores the user data on storage media 106. Subsequently, disk device 102 reads storage media 106 and transfers a corresponding read signal 134 to read channel 120. Write signal 133 and read signal 134 should both represent the same user data. Read channel 120 processes read signal 134 to generate data signal 139. Ideally, data signal 139 carries the same data as data signal 130.

Write channel 110 operates as follows. Encoder 112 receives and encodes data signal 130 to generate encoded signal 131. The encoding provides error-checking capability when the data is subsequently decoded. Encoder 112 transfers encoded signal 131 to compensation 114. Compensation 114 adjusts the timing of transitions in encoded signal 131 to generate time-adjusted signal 132. Compensation 114 transfers time-adjusted signal 132 to interface 116. Interface 116 converts time-adjusted signal 143 from digital to analog to generate write signal 133. Interface 116 transfers write signal 133 to disk device 102.

If storage media 106 is a magnetic disk, then write signal 133 drives a magnetic head that alters a magnetic field to create magnetic transitions on the magnetic disk. These magnetic transitions should represent the user data. The magnetic head subsequently detects the magnetic transitions to generate read signal 134. It storage media 106 is an optical disk, then write signal 133 drives a system that creates pits in the surface of the optical disk. The pits are physical transitions that represent the user data. An optical head subsequently projects a laser onto the surface of the disk. The optical head detects the reflection of the laser, which is altered by the pits, to generate read signal 134.

The accurate positioning of heads relative to disks is essential for proper system operation. To provide for accurate positioning, servo information is also stored on the disk, and read signal 134 includes this servo information. The control circuitry 104 processes the servo information from read signal 134 to control the location of the heads relative to the disks. The servo information includes Gray codes that allow control circuitry 104 to position the heads over the desired tracks.

Read channel 120 operates as follows. Sampler 121 receives and samples read signal 134 to generate read samples 135. Sampler 121 transfers read samples 134 to adaptive filter 122. Adaptive filter 122 removes distortion by shaping read samples 135 to generate equalized samples 136. Adaptive filter 122 transfers equalized samples 136 to interpolator 123. Interpolator 123 synchronizes equalized samples 136 with the clock for detector 124 to generate interpolated samples 137. Interpolator 123 transfers interpolated samples 137 to detector 124. Detector 124 uses a detection algorithm, such as a Viterbi state machine, to convert interpolated samples 137 into encoded signal 138 that represents the user data. Detector 124 transfers encoded signal 138 to decoder 125. Decoder 125 decodes encoded signal 138 into data signal 139 by applying a decoding technique, such as PR4 with D=1 constraints. Decoder 125 also performs error-checking functions.

FIG. 2 illustrates the servo system of disk drive system 100. The disk drive system 100 includes disk device 102 and control circuitry 104. Disk device 102 includes storage media 106 and position system 244. Control circuitry 104 includes read channel 120 and servo control 243. Read channel 120 includes detector 124, which includes Gray code detector 240.

In operation, disk device 102 transfers read signal 134 from storage media 106 to read channel 120 in control circuitry 104. Read channel 120 processes read signal 134 as described above and transfers data signal 139 to servo control 243. In addition, detector 124 transfers interpolated samples 137 to Gray code detector 240.

Gray code detector 240 looks for a bit sequence (1,1,-1,-1) which is placed in the Gray code for detection purposes. A multiplier in Gray code detector 240 receives interpolated samples 137 and an inverted sign bit. The sign bit is controlled to match the polarity of the samples with the polarity of Gray code detector 240. The multiplier transfers the polarity-adjusted samples to a matched filter. The matched filter produces an output as follows for a sequence of four samples (B0,B1,B2,B3):

$$\text{Filter output} = 1 + D - D^2 - D^3 = B0 + B1 - B2 - B3$$

Although the actual filter inputs are in increments of $\frac{1}{16}$ from ($-\frac{32}{16}$) to ($+\frac{31}{16}$), the following discussion of the filter assumes that filter inputs are discreet integer values of $-1, 0,$ or $+1$ for the sake of simplicity. The filter output is +4 for the Gray code detection bit sequence (1,1,-1,-1). The filter transfers its output to the A input of an A>B comparator. The A>B comparator receives a threshold (THR) at the B input where THR is set from (1.0)–(3.0). The comparator produces a one bit when its condition is met. The A>B comparator, with B=THR=3.0, produces a one bit when A=4.0, which occurs when the filter processes the Gray code detection bit sequence (1,1,-1,-1). The output of the comparator is passed through a decimator that eliminates every three out of four bits to remove unnecessary or redundant information. The decimator indicates Gray code detection in Gray code detection signal 246 that it transfers to servo control 243.

In response to Gray code detection, servo control 243 recovers the Gray code from data signal 139. Servo control 243 processes the Gray code to generate position signal 247 that will position disk device 102 at the target position. Servo control 243 transfers position signal 247 to position system 244 in disk device 102. Position system 244 positions storage media 106 to the target position in response to position signal 247. Typically, positioning entails moving a selected head over a desired track and waiting for a precise time to elapse after servo mark detection in the desired track.

FIG. 3 illustrates a portion of some of the tracks on storage media 106. Each track includes a servo mark, Gray code, and servo burst inserted between user data. Servo control 243 and position system 244 perform two basic positioning operations—seek and follow. In a seek operation, servo control 243 uses cylinder numbers from the Gray codes to position the head over the desired track. In a follow operation, servo control 243 uses signals from the servo burst to center the head over the desired track. Servo control 243 must receive accurate Gray code detection to effectively process the Gray codes and position disk device 102.

Gray code detection after a seek operation can be a problem. On a seek from track three to track one, the re-acquisition of the Gray code is eased because the Gray codes are aligned, so there is no phase shift. Thus, Gray code detector 240 knows when to expect the Gray code in track one. The problem occurs after a seek from track four to track one because the respective Gray codes are not aligned and Gray code detector 240 must handle a phase shift between the Gray codes. Thus, Gray code detector 240 expects the Gray code in track one at the wrong time. Unfortunately, the detector often fails to detect a Gray code in the presence of a phase shift. The failure to detect the Gray code interrupts normal system operation.

Figure 4:
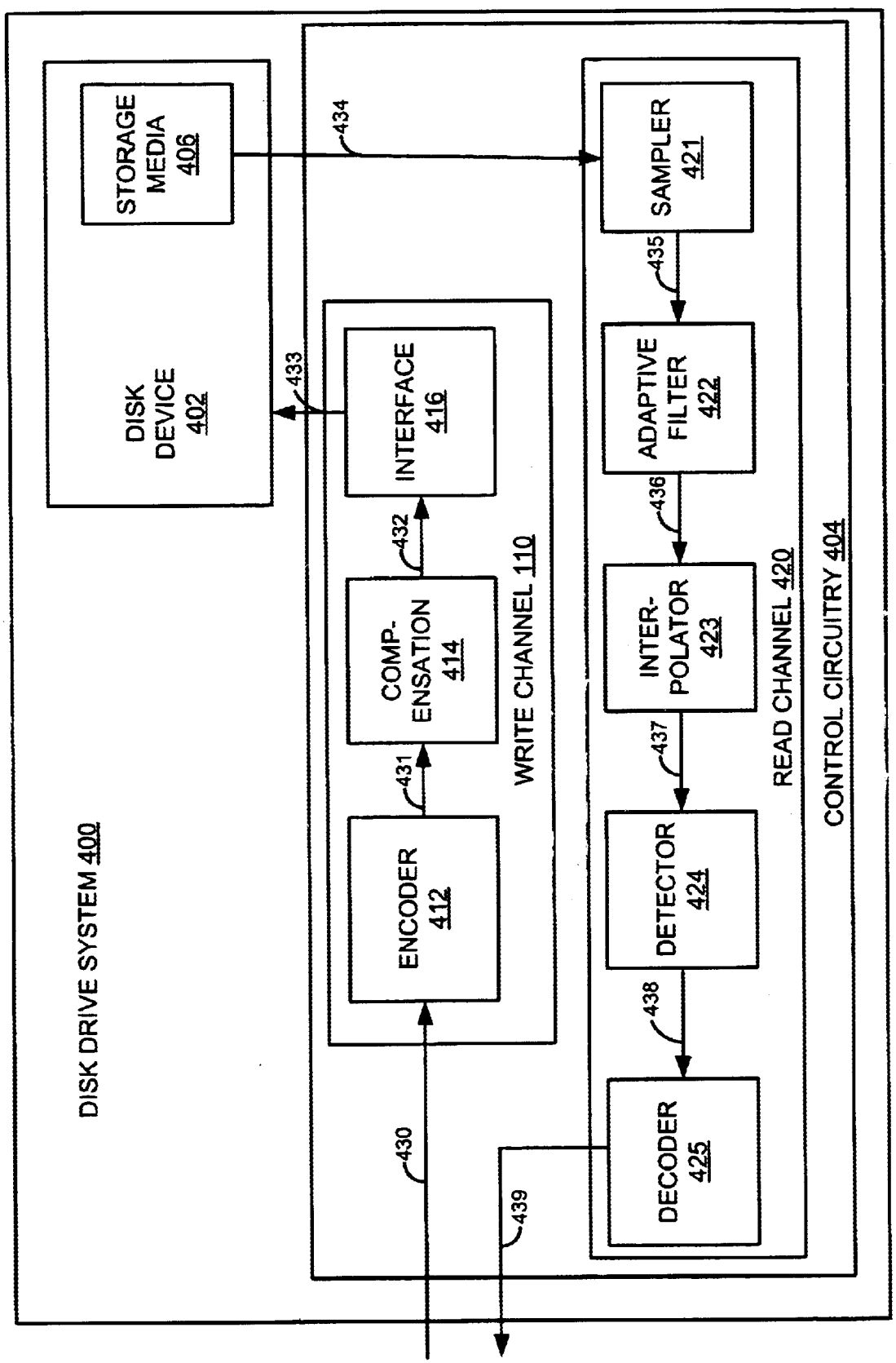
FIG. 4 is a block diagram that illustrates a disk drive system in an example of the invention.
Figure 5:
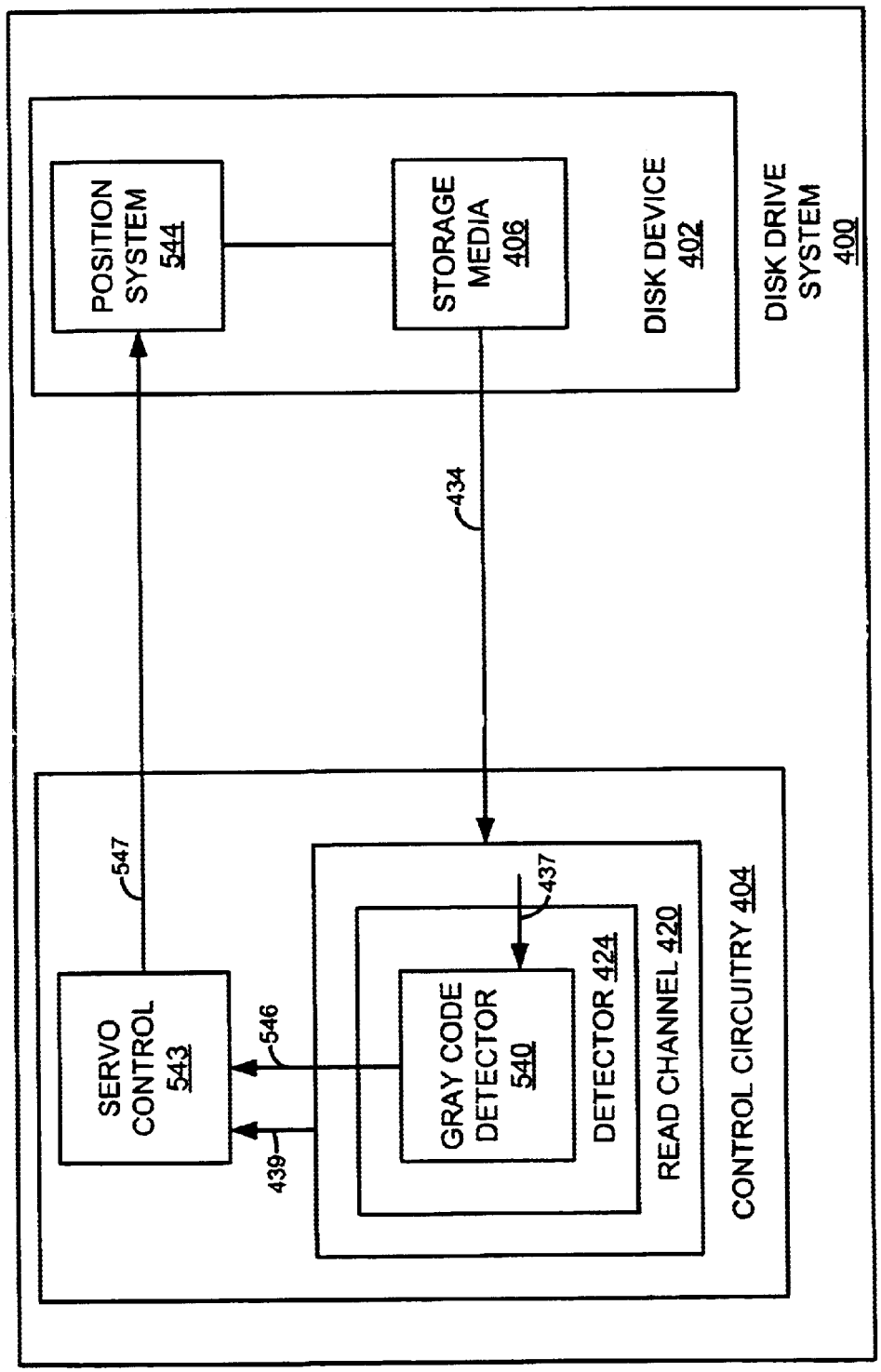
FIG. 5 is a block diagram that illustrates a servo system in an example of the invention.

Disk Drive System Configuration and Operation—
FIGS. 4–5

FIGS. 4–5 depict an example of a disk drive system in an embodiment of the invention. Those skilled in the art will appreciate numerous variations from this example that do not depart from the scope of the invention. Those skilled in the art will also appreciate that various features could be combined to form multiple variations of the invention.

FIG. 4 illustrates the user data path for disk drive system 400. Disk drive system 400 includes disk device 402 and associated control circuitry 404. Disk device 402 includes storage media 406. Some examples of storage media 406 include magnetic disks and optical disks. Control circuitry 404 includes write channel 410 and read channel 420. Write channel 410 includes encoder 412, compensation 414, and write interface 416 connected in series. Read channel 420 includes sampler 421, adaptive filter 422, interpolator 423, detector 424, and decoder 425 connected in series. Interface 416 and sampler 421 are coupled to disk device 402.

Write channel 410 receives data signal 430 and transfers a corresponding write signal 433 to disk device 402. Disk device 402 stores the user data on storage media 406. Subsequently, disk device 402 reads storage media 406 and transfers a corresponding read signal 434 to read channel 420. Write signal 433 and read signal 434 should both represent the same user data. Read channel 420 processes read signal 434 to generate data signal 439. Ideally, data signal 439 carries the same user data as data signal 430.

Write channel 410 operates as follows. Encoder 412 receives and encodes data signal 430 to generate encoded signal 431. The encoding provides error-checking capability when the data is subsequently decoded. Encoder 412 transfers encoded signal 431 to compensation 414. Compensation 414 adjusts the timing of transitions in encoded signal 431 to generate time-adjusted signal 432. Compensation 414 transfers time-adjusted signal 432 to interface 416. Interface 416 converts time-adjusted signal 443 from digital to analog to generate write signal 433. Interface 416 transfers write signal 433 to disk device 402.

Read channel 420 operates as follows. Sampler 421 receives and samples read signal 434 to generate read samples 435. Sampler 421 transfers read samples 434 to adaptive filter 422. Adaptive filter 422 removes distortion by shaping read samples 435 to generate equalized samples 436. Adaptive filter 422 transfers equalized samples 436 to interpolator 423. Interpolator 423 synchronizes equalized samples 436 with the clock for detector 424 to generate interpolated samples 437. Interpolator 423 transfers interpolated samples 437 to detector 424. Detector 424 uses a detection algorithm, such as a Viterbi state machine, to convert interpolated samples 437 into an encoded signal 438 that represents the user data. Detector 424 transfers encoded signal 438 to decoder 425. Decoder 425 decodes encoded signal 438 into data signal 439 by applying a decoding technique, such as PR4 with D=1 constraints. Decoder 425 also performs error-checking functions.

FIG. 5 illustrates the servo system of disk drive system 400. The disk drive system 400 includes disk device 402 and control circuitry 404. Disk device 402 includes storage media 406 and position system 544. Control circuitry 404 includes read channel 420 and servo control 543. Read channel 420 includes detector 424, which includes Gray code detector 540. Aside from Gray code detector 540, the other components on FIGS. 4–5 could be conventional.

Gray code detector 540 could be integrated with servo mark detection circuitry. An example of such servo mark detection circuitry is disclosed in patent application entitled "SERVO MARK DETECTION FOR A DISK DRIVE SYSTEM", which was filed on the same day as this application, which has the same inventors and assignee as this application, and which is incorporated by reference into this application.

In operation, disk device 402 transfers read signal 434 from storage media 406 to read channel 420 in control circuitry 404. Read channel 420 processes read signal 434 as described above and transfers data signal 439 to servo control 543. In addition, detector 424 transfers interpolated samples 437 to Gray detector 540. Gray code detector detects the Gray code, even in the presence of phase shift, and transfers a Gray code detection signal 546 to servo control 543.

In response to Gray code detection, servo control 543 recovers the Gray code from data signal 439. Servo control 543 processes the gray code to generate position signal 547 that will position disk device 402 to the target position. Servo control 543 transfers position signal 547 to position system 544 in disk device 102. Position system 544 positions storage media 406 to the target position in response to position signal 547. Typically, positioning entails moving a selected head over a desired track and waiting for a precise time to elapse after servo mark detection.

Figure 6:
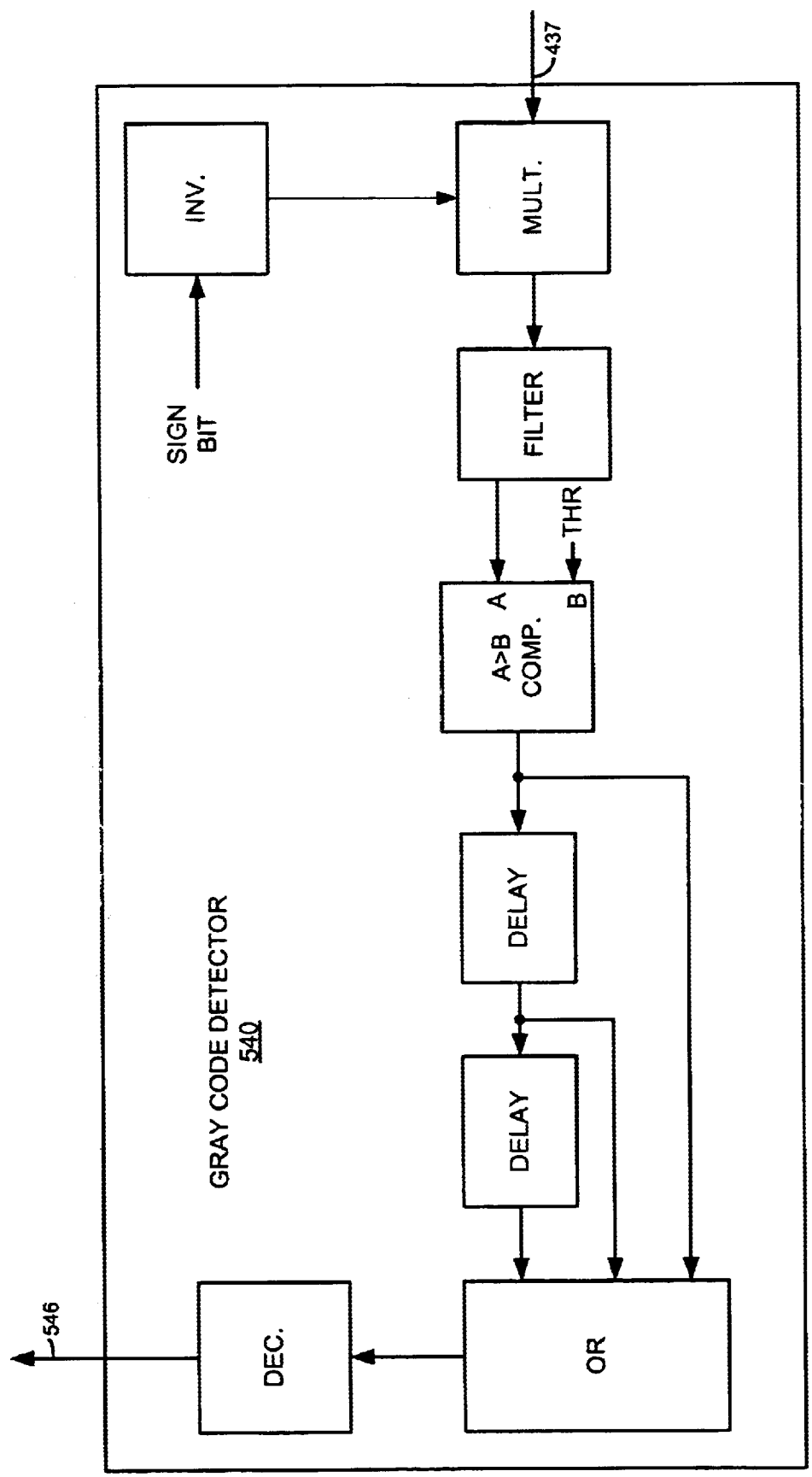
FIG. 6 is a block diagram that illustrates a Gray code detector in an example of the invention.

Gray Code Detector—FIG. 6

FIG. 6 depicts an example of Gray code detector 540 in an embodiment of the invention. Those skilled in the art will appreciate numerous variations from this example that do not depart from the scope of the invention. Those skilled in the art will also appreciate that various features could be combined to form multiple variations of the invention.

Gray code detector 540 looks for the Gray code detection bit sequence (1,1,−1,−1). Starting at the right of FIG. 6, a multiplier receives interpolated samples 437 and an inverted sign bit. The sign bit is controlled to match the polarity of the samples with the polarity of Gray code detector 540. The multiplier transfers the polarity-adjusted samples to a matched filter. The matched filter produces an output as follows for a sequence of four samples (B0,B1,B2,B3):

$$\text{Filter output}=1+D-D^2-D^3=B0+B1-B2-B3$$

Although the actual filter inputs are in increments of $\frac{1}{16}$ from $(-\frac{32}{16})$ to $(+\frac{31}{16})$, the following discussion of the filter assumes that filter inputs are discreet integer values of −1, 0, or +1 for the sake of simplicity. The filter output is +4.0 for the Gray code detection bit sequence (1,1,−1,−1). The filter transfers its output to the A input of an A>B comparator. The A>B comparator receives a threshold (THR) at the B input where THR is set from (1.0)–(3.0). The comparator produces a one bit when its condition is met. The A>B comparator, with B=THR=3.0, produces a one bit when A=4.0, which occurs when the filter processes the Gray code detection bit sequence (1,1,−1,−1).

The comparator transfers its output to an OR gate. The comparator output is also delayed by one bit time and transferred to the OR gate, and delayed by two bit times and transferred to the OR gate. Thus, the OR gate produces a one bit for three consecutive bit times after the comparator indicates a match with the Gray code detection bit sequence. Advantageously, the delays allow Gray code detector 540 to handle the phase shifts that are encountered after seek operations. The output of the OR gate is passed through a decimator that eliminates every three out of four bits to remove unnecessary or redundant information. The decimator indicates Gray code detection in Gray code detection signal 546 that it transfers to servo control 243.

Those skilled in the art will appreciate variations of the above-described embodiments that fall within the scope of the invention. As a result, the invention is not limited to the specific examples and illustrations discussed above, but only by the following claims and their equivalents.

What is claimed is:

1. A disk drive system comprising:
   a disk device configured to read storage media to generate a read signal representing data and transfer the read signal to control circuitry; and
   control circuitry configured to receive the read signal, process the read signal to detect a bit sequence associated with a Gray code, generate an initial indication that the bit sequence has been detected, delay the initial indication to generate a delayed indication that the bit sequence has been detected, and detect the Gray code in response to the initial indication and the delayed indication to handle phase shift.

2. The disk drive system of claim 1 wherein the control circuitry includes a matched filter and comparator configured to detect the bit sequence.

3. The disk drive system of claim 1 wherein the control circuitry is configured to generate and transfer a position signal to the disk device in response to the Gray code detection.

4. The disk drive system of claim 3 wherein the disk device is configured to position the storage media in response to the position signal.

5. The disk drive system in claim 1 wherein the control circuitry is further configured to sample the read signal to generate read samples.

6. The disk drive system in claim 5 wherein the control circuitry is further configured to adaptively filter the read samples to generate equalized samples.

7. The disk drive system in claim 6 wherein the control circuitry is further configured to interpolate the equalized samples to generate interpolated samples.

8. The disk drive system in claim 7 wherein the control circuitry is further configured to detect an encoded signal from the interpolated samples.

9. The disk drive system in claim 8 wherein the control circuitry is further configured to decode the encoded signal.

10. Disk drive control circuitry comprising:
- detection circuitry configured to detect a bit sequence associated with a Gray code in and generate an initial indication that the bit sequence has been detected; and
- delay circuitry configured to delay the initial indication to generate a delayed indication that the bit sequence has been detected to handle phase shift, and to generate a Gray code detection signal in response to the initial indication and the delayed indication.

11. The control circuitry of claim 10 wherein the detection circuitry includes a matched filter and comparator configured to detect the bit sequence.

12. The disk drive control circuitry of claim 10 further comprising servo control circuitry configured to generate and transfer a position signal in response to the Gray code detection signal.

13. The disk drive control circuitry of claim 10 further comprising a read channel configured to sample a read signal to generate read samples.

14. The disk drive control circuitry of claim 13 wherein the read channel is configured to adaptively filter the read samples to generate equalized samples.

15. The disk drive control circuitry of claim 14 wherein the read channel is configured to interpolate the equalized samples to generate interpolated samples.

16. The disk drive control circuitry of claim 15 wherein the read channel is configured to detect an encoded signal from the interpolated samples.

17. The disk drive control circuitry of claim 16 wherein the read channel is configured to decode the encoded signal.

18. A read channel comprising:
- a sampler configured to receive and sample a read signal to generate read samples;
- an adaptive filter configured to receive and shape the read samples to generate equalized samples;
- an interpolator configured to receive and interpolate the equalized samples to generate interpolated samples;
- a detector configured to receive the interpolated samples, detect an encoded signal from the interpolated samples, detect a bit sequence associated with a Gray code from the interpolated samples, generate an initial indication that the bit sequence has been detected, delay the initial indication to generate a delayed indication that the bit sequence has been detected to handle phase shift, and generate a Gray code detection signal in response to the initial indication and the delayed indication; and
- a decoder configured to receive and decode the encoded signal.

19. The read channel of claim 18 wherein the detector includes a matched filter and comparator configured to detect the bit sequence.

20. A method of operating a disk drive system, the method comprising:
- reading storage media to generate a read signal representing data;
- processing the read signal to detect a bit sequence associated with a Gray code;
- generating an initial indication that the bit sequence has been detected;
- delaying the initial indication to generate a delayed indication that the bit sequence has been detected; and
- detecting the Gray code in response to the initial indication and the delayed indication to handle phase shift.

21. The method of claim 20 wherein processing the read signal comprises using a matched filter and comparator to detect the bit sequence.

22. The method of claim 20 further comprising generating a position signal in response to the Gray code detection.

23. The method of claim 22 further comprising positioning the storage media in response to the position signal.

24. The method of claim 20 further comprising sampling the read signal to generate read samples.

25. The method of claim 24 further comprising adaptively filtering the read samples to generate equalized samples.

26. The method of claim 25 further comprising interpolating the equalized samples to generate interpolated samples.

27. The method of claim 26 further comprising detecting an encoded signal from the interpolated samples.

28. The method of claim 27 further comprising decoding the encoded signal.

29. A method for operating disk drive control circuitry, the method comprising:
- detecting a bit sequence associated with a Gray code;
- generating an initial indication that the bit sequence has been detected;
- delaying the initial indication to generate a delayed indication that the bit sequence has been detected to handle phase shift; and
- generating a Gray code detection signal in response to the initial indication and the delayed indication.

30. The method of claim 29 wherein detecting the bit sequence comprises using a matched filter and comparator.

31. The method of claim 29 further comprising generating a position signal in response to the Gray code detection signal.

32. The method of claim 29 further comprising sampling a read signal to generate read samples.

33. The method of claim 32 further comprising adaptively filtering the read samples to generate equalized samples.

34. The method of claim 33 further comprising interpolating the equalized samples to generate interpolated samples.

35. The method of claim 34 further comprising detecting an encoded signal from the interpolated samples.

36. The method of claim 35 further comprising decoding the encoded signal.

37. A method of operating a read channel, the method comprising:
- sampling a read signal to generate read samples;
- shaping the read samples to generate equalized samples;
- interpolating the equalized samples to generate interpolated samples;
- detecting a bit sequence associated with a Gray code from the interpolated samples;
- generating an initial indication that the bit sequence has been detected;
- delaying the initial indication to generate a delayed indication that the bit sequence has been detected to handle phase shift;
- generating a Gray code detection signal in response to the initial indication and the delayed indication;
- detecting an encoded signal from the interpolated samples; and
- decoding the encoded signal.

38. The method of claim 27 wherein detecting the bit sequence comprises using a matched filter and comparator.

* * * * *